US012738261B2

(12) United States Patent
Tanase

(10) Patent No.: US 12,738,261 B2
(45) Date of Patent: Sep. 15, 2026

(54) SYSTEM AND METHOD FOR COMMUNICATING VOICE

(71) Applicant: TOYOTA JIDOSHA KABUSHIKI KAISHA, Toyota (JP)

(72) Inventor: Noboru Tanase, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 18/746,441

(22) Filed: Jun. 18, 2024

(65) Prior Publication Data

US 2026/0045249 A1 Feb. 12, 2026

(30) Foreign Application Priority Data

Jul. 21, 2023 (JP) ................................ 2023-119279

(51) Int. Cl.

*G10L 13/00* (2006.01)
*B60K 35/26* (2024.01)

(Continued)

(52) U.S. Cl.

CPC ........ *G10L 13/0335* (2013.01); *B60K 35/265* (2024.01); *G10L 13/027* (2013.01)

(58) Field of Classification Search

CPC ..... G10L 15/16; G10L 15/18; G10L 15/1807; G10L 15/1815; G10L 15/1822; G10L 13/00; G10L 13/027; G10L 13/033; G10L 13/0335; G10L 13/047; G10L 13/086; G10L 15/00; G10L 2013/105; G10L 13/04; G10L 15/005; G10L 15/20; G10L 15/22;

(Continued)

(56) References Cited

U.S. PATENT DOCUMENTS 11,601,552 B2 * 3/2023 Scodary ................ G06F 16/683
2009/0112582 A1 4/2009 Kuwagaki et al.

(Continued)

FOREIGN PATENT DOCUMENTS

CN 115083391 A 9/2022
JP 2001-033256 A 2/2001

(Continued)

OTHER PUBLICATIONS

Y. Rong, C. Han, C. Hellert, A. Loyal and E. Kasneci, "Artificial Intelligence Methods in In-Cabin Use Cases: A Survey," in IEEE Intelligent Transportation Systems Magazine, vol. 14, No. 3, pp. 132-145, May-Jun. 2022 (Year: 2022).*

(Continued)

*Primary Examiner* — Edgar X Guerra-Erazo
(74) *Attorney, Agent, or Firm* — Oliff PLC

(57) ABSTRACT

The present disclosure provides a voice communication system. The voice communication system comprises processing circuitry. The processing circuitry generates an artificial voice similar to a human voice by a machine learning model. Then, the processing circuitry communicates the generated artificial voice to a user of a vehicle. The processing circuitry acquires a first parameter related to at least one of a motion of the vehicle and an operation amount input by a driver of the vehicle and changes a second parameter related to a property of the artificial voice so as to be linked to the first parameter.

18 Claims, 6 Drawing Sheets

(51) Int. Cl.
*G10L 13/027* (2013.01)
*G10L 13/033* (2013.01)

(58) Field of Classification Search
CPC ............. G10L 15/222; G10L 2015/221; G10L 2015/223; G10L 2015/225; G10L 2015/227; G10L 2015/226; G10L 2015/228; G10L 15/25; G10L 15/24; G10L 15/34; G10L 15/32; G10L 15/30; G06N 20/00; G06N 3/08; G06N 3/045; G06N 3/0455; G06N 3/0464; G06N 3/047; G06N 3/0475; G06N 3/048; G06N 3/049; G06N 3/0495; G06N 3/0499; G06N 20/20; G06N 20/10
See application file for complete search history.

(56) References Cited

U.S. PATENT DOCUMENTS

| | | | | |
|---|---|---|---|---|
| 2020/0339145 | A1 | 10/2020 | Zhang et al. | |
| 2021/0029248 | A1* | 1/2021 | Scodary | G06F 16/683 |
| 2024/0411808 | A1* | 12/2024 | Gupta | G01C 21/3679 |

FOREIGN PATENT DOCUMENTS

| | | | |
|---|---|---|---|
| JP | 2002-169582 | A | 6/2002 |
| JP | 2004-046400 | A | 2/2004 |
| JP | 2007-279975 | A | 10/2007 |
| JP | 2022-41505 | A | 3/2022 |
| WO | 2021216768 | A1 | 10/2021 |

OTHER PUBLICATIONS

Leelavathy et al., "Effective Traffic Model for Intelligent Traffic Monitoring Enabled Deep RNN Algorithm for Autonomous Vehicles Surveillance Systems," 2023 4th International Conference on Smart Electronics and Communication (ICOSEC), Trichy, India, 2023, pp. 1191-1200 (Year: 2023).*

Y. Qu, H. Hu, J. Liu, Z. Zhang, Y. Li and X. Ge, "Driver State Monitoring Technology for Conditionally Automated Vehicles: Review and Future Prospects," in IEEE Transactions on Instrumentation and Measurement, vol. 72, pp. 1-20, 2023 (Year: 2023).*

S. M. Sarala, D. H. Sharath Yadav and A. Ansari, "Emotionally Adaptive Driver Voice Alert System for Advanced Driver Assistance System (ADAS) Applications," 2018 International Conference on Smart Systems and Inventive Technology (ICSSIT), Tirunelveli, India, 2018, pp. 509-512. (Year: 2018).*

* cited by examiner

| First parameter | Second parameter |
| --- | --- |
| Acceleration (Large⇔Small) | Pitch (High⇔Low) |
| Speed (High⇔Low) | Volume (Large⇔Small) |
| Yaw rate (Large⇔Small) | Sound quality |

*Fig. 4*

SYSTEM AND METHOD FOR COMMUNICATING VOICE

CROSS-REFERENCE TO RELATED APPLICATION

The present application claims priority under 35 U.S.C. § 119 to Japanese Patent Application No. 2023-119279, filed on Jul. 21, 2023, the contents of which application are incorporated herein by reference in their entirety.

FIELD

The present disclosure relates to a technique for communicating voice to a user of a vehicle, and more particularly, to a technique for communicating an artificial voice generated by a machine learning model.

JP2007-279975A discloses an in-vehicle device which replays voice toward a user riding on a vehicle based on speech voice information data received from a roadside device. The in-vehicle device includes utterance speed determination means and voice signal generation means. The utterance speed determination means determines an utterance speed corresponding to a situation when replaying the voice from the received speech voice information data. The voice signal generation means generates a voice signal based on the speech voice information data so as to achieve the determined utterance speed. Then, the voice based on the generated voice signal is output from a speaker or the like to the user. According to the utterance speed determination means, in order to more reliably attract the user's attention, the utterance speed is set to be high when the speech voice information data represents an urgent situation.

As shown in JP2007-279975A, a device for communicating voice to a user of a vehicle is known. In addition to JP2007-279975A, the following JP2001-033256A and JP2004-046400A can be exemplified as documents showing the technical level at the time of filing in the technical field of the present disclosure.

SUMMARY

It is considered that a machine learning model is applied to a device which communicates voice to a user of a vehicle and an artificial voice generated by the machine learning model is output to the user. By applying the machine learning model, it is possible to make the artificial voice closer to voice of a living human, but it may be difficult for the user hearing the artificial voice to distinguish the artificial voice from the actual human voice. However, from a viewpoint of transparency of a system to which the machine learning model is applied, it is desirable that the user can easily distinguish the artificial voice generated by the machine learning model from the human voice.

An object of the present disclosure is to provide a technique for, in a system which communicates an artificial voice generated by a machine learning model to a user of a vehicle, ensuring ease of distinction between the artificial voice and a human voice.

The present disclosure provides a voice communication system. The voice communication system comprises processing circuitry. The processing circuitry generates an artificial voice similar to a human voice by a machine learning model. Then, the processing circuitry communicates the generated artificial voice to a user of a vehicle. The processing circuitry acquires a first parameter related to at least one of a motion of the vehicle and an operation amount input by a driver of the vehicle and changes a second parameter related to a property of the artificial voice so as to be linked to the first parameter.

In the voice communication system of the present disclosure, the first parameter may be acceleration of the vehicle and the second parameter may be pitch of the artificial voice. The processing circuitry may link the first parameter and the second parameter such that the pitch of the artificial voice becomes higher as the acceleration increases.

The present disclosure provides a voice communication method. The voice communication method of the present disclosure includes the following steps. The first step is generating an artificial voice similar to a human voice by a machine learning model. The second step is communicating the artificial voice to a user of a vehicle. The third step is acquiring a first parameter related to at least one of a motion of the vehicle and an operation amount input by a driver of the vehicle. The fourth step is changing a second parameter related to a property of the artificial voice so as to be linked to the first parameter.

The present disclosure provides a non-transitory computer-readable storage medium storing a voice communication program comprising a plurality of executable instructions. The instructions cause a computer to execute the following steps. The first step is generating an artificial voice similar to a human voice by a machine learning model. The second step is communicating the artificial voice to a user of a vehicle. The third step is acquiring a first parameter related to at least one of a motion of the vehicle and an operation amount input by a driver of the vehicle. The fourth step is changing a second parameter related to a property of the artificial voice so as to be linked to the first parameter.

According to the technique of the present disclosure, a parameter related to a property of an artificial voice is changed so as to be linked to a parameter related to a motion of a vehicle or an operation amount input by a driver of the vehicle. Since voice uttered by an actual human does not change so as to be linked to the parameter related to the vehicle in this way, it is possible to prevent a user of the vehicle from erroneously recognizing the artificial voice emitted by the voice communication system as the actual human voice. Further, since it becomes not necessary to make the artificial voice a mechanical voice in order to prevent the user's misrecognition, it is possible to restrain the user's sense of incongruity against the artificial voice.

As described above, according to the technique of the present disclosure, it is possible to make it easy to distinguish the artificial voice generated by the machine learning model from the actual human voice while restraining a sense of incongruity of the user.

BRIEF DESCRIPTION OF THE DRAWINGS

FIG. 4 is a table showing examples of a combination of a first parameter and a second parameter.

DETAILED DESCRIPTION

Embodiments of the present disclosure will be described with reference to the accompanying drawings.

1. Overview of Voice Communication System

Figure 1:
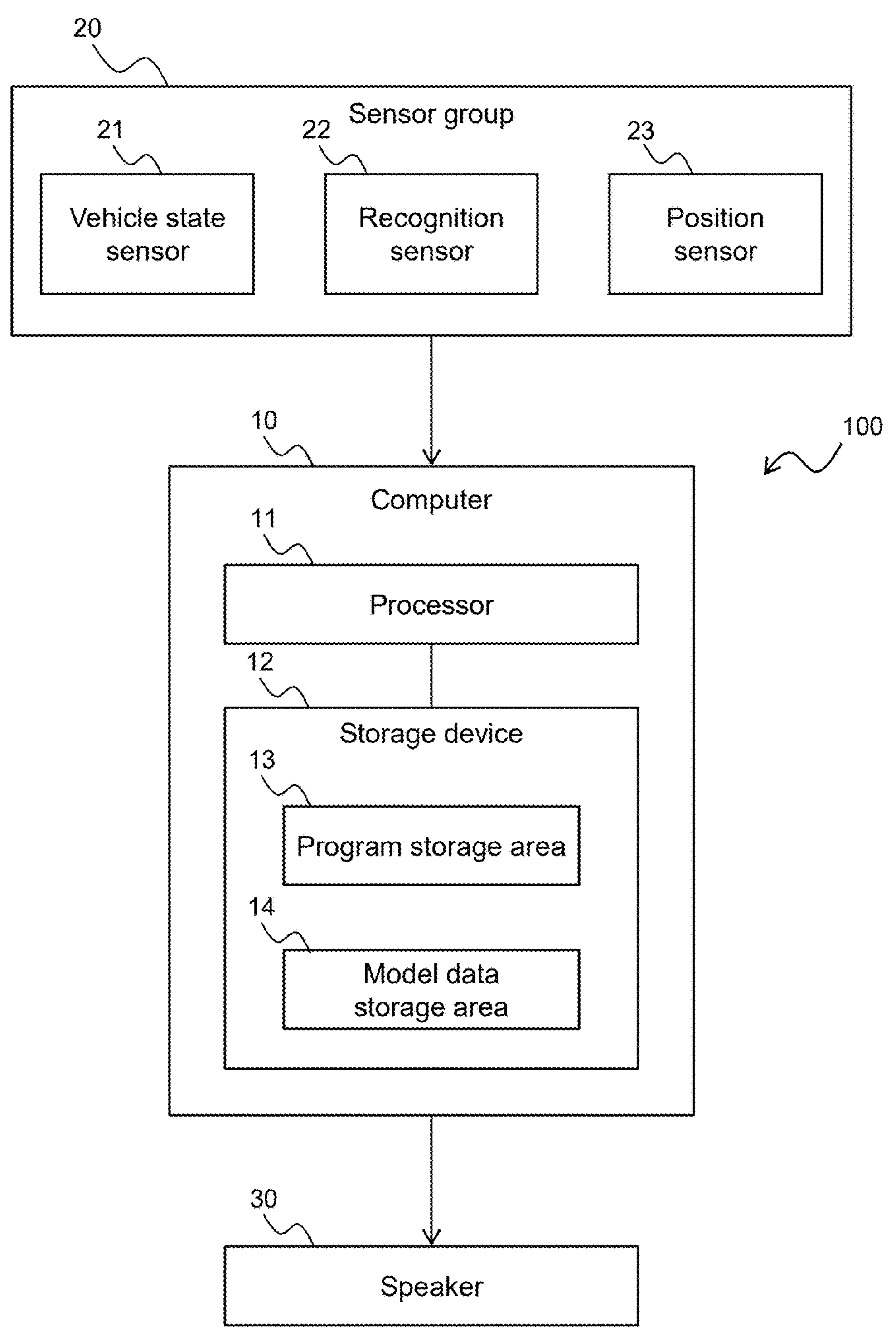
FIG. 1 is a block diagram showing an example of a configuration of the vehicle according to the present embodiment.

A voice communication system according to a present embodiment is a system which generates an artificial voice by a machine learning model and communicates the generated artificial voice to a user of a vehicle. The user to whom the artificial voice is to be communicated may be a driver of the vehicle or an occupant other than the driver. FIG. 1 is a diagram showing an example of a configuration of a vehicle 1, to which a voice communication system 100 according to the present embodiment is applied. The vehicle 1 may be a vehicle owned by an individual or may be a shared vehicle used for various mobility services. The vehicle 1 may be a vehicle which is autonomously driven by an autonomous driving apparatus.

The vehicle 1 includes a computer 10 which generates the artificial voice, a sensor group 20, and a speaker 30. The computer 10 is connected to the sensor group 20 and the speaker 30 via an in-vehicle network. The voice communication system 100 includes at least a computer 10. The voice communication system 100 may include the speaker 30 in addition to the computer 10. The voice communication system 100 may further include the sensor group 20.

The computer 10 is, for example, an electronic control unit (ECU) mounted on the vehicle 1 or assembly of a plurality of ECUs. Alternatively, some or all of functions of the computer 10 may be arranged in an external server. In this case, the vehicle 1 and the external server are connected to each other via a wireless communication network. In any case, the computer 10 includes one or more processors 11 (hereinafter, simply referred to as a processor 11 or processing circuitry) and one or more storage devices 12 (hereinafter, simply referred to as a storage device 12).

The processor 11 executes various processes. Examples of the processor 11 include a central processing unit (CPU), an application specific integrated circuit (ASIC), and a field-programmable gate array (FPGA). The processor 11 may be one type of processor or may include a plurality of types of processors.

Examples of the storage device 12 include a hard disk drive (HDD), a solid state drive (SSD), a volatile memory, and a nonvolatile memory. The storage device 12 may be one type of storage device or may include a plurality of types of storage devices. The storage device 12 includes at least a program storage area 13 and a model data storage area 14. These storage areas may be realized by a single storage device or may be respectively realized by separate storage devices.

One or more programs are stored in the program storage area 13. Each program is composed of a plurality of instructions. Various processes by the voice communication system 100 are realized by cooperation between the processor 11 executing the program and the storage device 12. The program stored in the program storage area 13 includes at least a voice communication program for making the processor 11 execute processing related to communication of the artificial voice. The voice communication program may be stored in a non-transitory computer-readable storage medium.

Model data is stored in the model data storage area 14. The model data stored in the model data storage area 14 is data of the machine learning model used for generating the artificial voice.

The storage device 12 may include a storage area other than the program storage area 13 and the model data storage area 14. For example, map information is stored in the storage area other than the program storage area 13 and the model data storage area 14.

The sensor group 20 includes a vehicle state sensor 21. The vehicle state sensor 21 detects a state of the vehicle 1. Specifically, the vehicle state sensor 21 detects parameters such as a speed, acceleration, a steering angle, a roll angular speed, a pitch angular speed, a yaw angular speed, an inclination angle of the vehicle 1, and the like. Examples of the vehicle state sensor 21 include a vehicle speed sensor, an acceleration sensor, a yaw rate sensor, a steering angle sensor, a roll angular speed sensor, a pitch angular speed sensor, a yaw angular speed sensor, and an inclination angle sensor. The sensor group 20 may further include a recognition sensor 22 and a position sensor 23. The recognition sensor 22 recognizes a situation around the vehicle 1. Examples of the recognition sensor 22 include a camera, a laser imaging detection and ranging (LiDAR), and a radar. Examples of the camera include a front camera, which captures a forward image from the vehicle 1, a back camera, which captures a backward image from the vehicle 1, and a side camera, which captures a lateral image from the vehicle 1. The position sensor 23 detects a position and an orientation of the vehicle 1. As the position sensor 23, a global navigation satellite system (GNSS) sensor is exemplified.

The computer 10 acquires information detected by these sensors through the in-vehicle network. For example, the computer 10 acquires the state of the vehicle 1 from the vehicle state sensor 21. The computer 10 may also acquire information detected by the recognition sensor 22 and the position sensor 23. Further, the computer 10 may perform processing of detecting an object present around the vehicle 1, measuring a relative position and a relative speed of the detected object with respect to the vehicle 1, and the like based on the information acquired from the recognition sensor 22.

The speaker 30 is a speaker that communicates the artificial voice generated by the computer 10 to the user of the vehicle 1. The speaker 30 may include a plurality of speakers. Data of the artificial voice generated by the computer 10 is transmitted to the speaker 30 via the in-vehicle network. Then, the speaker 30 replays the voice based on the received data, thereby communicating the artificial voice to the user.

Figure 2:
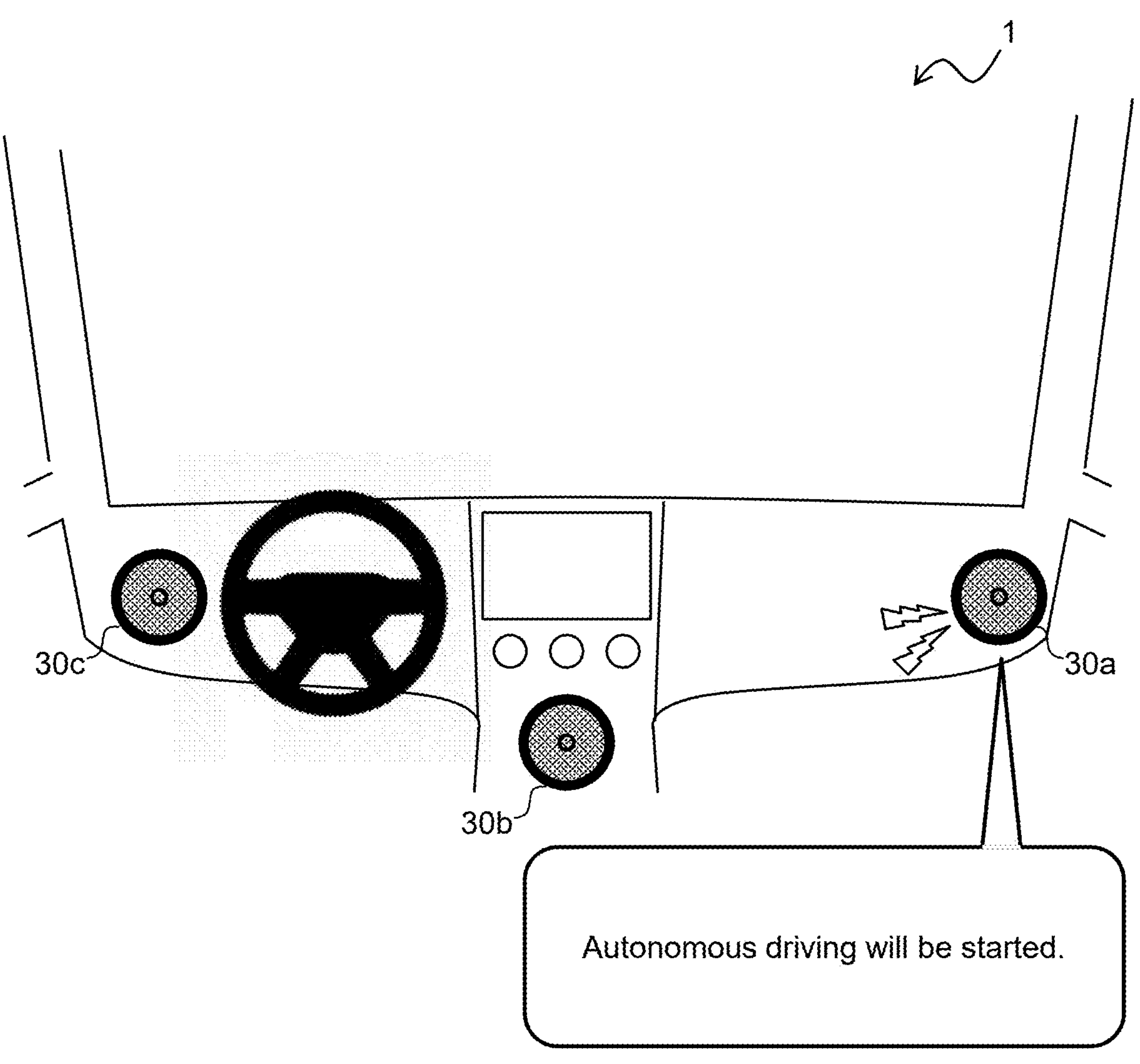
FIG. 2 is a schematic diagram showing an example of a scene in which the voice is communicated by the voice communication system according to the present embodiment.

The example of the configuration of the voice communication system 100 is described above. Next, communication of the artificial voice by the voice communication system 100 is described by giving a specific scene as an example. FIG. 2 is a schematic diagram showing an example of a scene in which the artificial voice is communicated.

In the example of FIG. 2, the speaker 30 includes three speakers, a speaker 30*a*, a speaker 30*b*, and a speaker 30*c*. The artificial voice is communicated to the user by using the speaker 30*a* among these three speakers. Like this scene, when the speaker 30 includes a plurality of speakers, the speaker which emits sound at one time may be one speaker. Alternatively, the voice may be simultaneously emitted from a plurality of speakers.

In the example shown in FIG. 2, the vehicle 1 is an autonomously driving vehicle, and a voice message "Autonomous driving will be started" is communicated to notify the user that autonomous driving of the vehicle 1 is started. In this way, the voice communication system 100 can convey information to the user of the vehicle 1 by communicating the artificial voice. As other examples of the content of the communicated artificial voice, messages such as "We will be departing now", "We will change lanes", "We will arrive at the destination soon", "We will enter a sharp curve", "We are approaching an intersection. Please take care of a pedestrian jumping out", "We are getting close to a preceding vehicle. Please keep the distance from the vehicle ahead", "We entered a road with a different speed limit. The vehicle speed is changed", are exemplified. However, the communicated artificial voice is not limited to voice which provides information. The communicated artificial voice may be voice for attracting attention, such as voice which is emitted to give a warning when the user's drowsiness is detected.

In order to convey these messages, the computer 10 generates the artificial voice modeled after a human voice using the machine learning model. Here, owing to the recent advancements in technology, an artificial voice generated using a machine learning model can be made close to the actual human voice. By making the artificial voice close to the actual human voice, it is possible to reduce a sense of discomfort of the user, who receives the voice, compared to a case where a mechanical voice is replayed. On the other hand, it may be difficult for the user to distinguish whether the voice is the artificial voice or the actual human voice when the user hears the voice. For example, in the scene of FIG. 2, the driver of the vehicle 1 who hears the voice replayed by the speaker **30*a* may erroneously recognize the voice as the voice emitted from another person riding on the vehicle 1, for example, an occupant sitting on the passenger seat. As another example, the user may erroneously recognize the voice as voice communicated from a person outside the vehicle 1** via a wireless communication.

From a viewpoint of transparency of a system to which the machine learning model is applied, it is desirable for the user of the vehicle 1 to be able to easily discriminate the artificial voice generated by the machine learning model from the actual human voice. However, in order to reduce a sense of discomfort of the user who hears the artificial voice, the artificial voice itself is required to be close to the human voice, not a mechanical voice.

When hearing some voice, a person can distinguish whether the voice is the actual human voice or the artificial voice based on whether a property of the voice changes naturally. The properties of the voice, for example, volume, pitch, and sound quality, change even in usual conversation of an actual human, but the change does not follow a certain rule. For example, a topic, an attitude of a companion of conversation, and a change in the surrounding environment can be exemplified as factors which change the properties of the human voice in conversation, but these factors do not provide regularity to the change in the properties of voice. Thus, when there is some regularity in the change of the voice heard by the person, the person instinctively feels the change of the voice unnatural and can unconsciously distinguish that the voice is not the actual human voice, that is, the voice is the artificial voice.

Therefore, the voice communication system 100 according to the present embodiment acquires a parameter related to a motion of the vehicle as a first parameter. Then, the voice communication system 100 changes a second parameter related to the property of the artificial voice so as to be linked to the first parameter. By regularly changing the second parameter so as to be linked to the first parameter, the artificial voice communicated by the voice communication system 100 can be easily distinguished from the actual human voice.

2. Example of Processing

Figure 3:
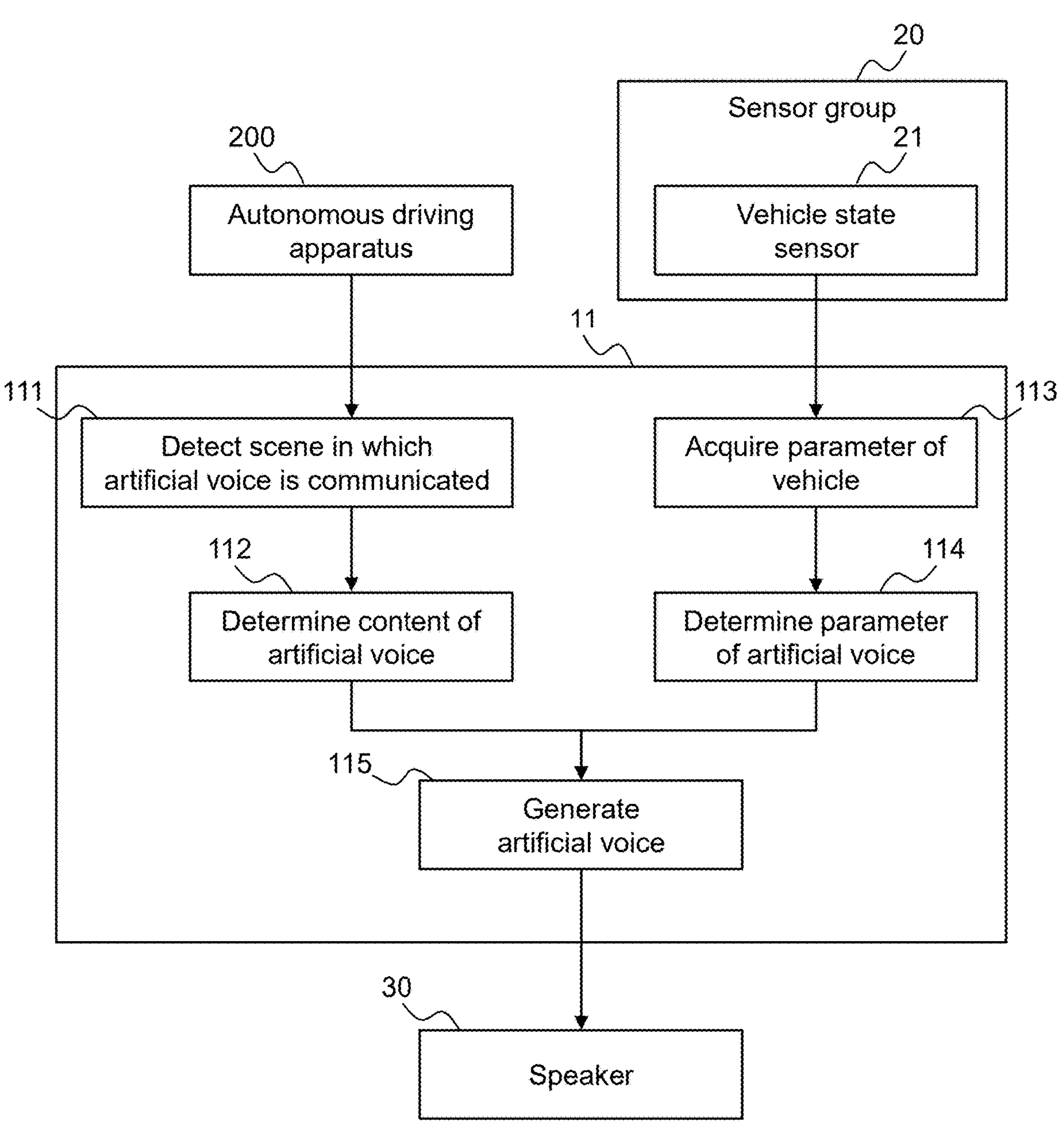
FIG. 3 is a block diagram showing an example of processing by the voice communication system.

FIG. 3 is a block diagram showing an example of processing executed by the processor 11 executing the voice communication program. By executing the voice communication program, the processor 11 executes a process 111, a process 112, a process 113, a process 114, and a process 115.

First, the processor 11 executes the process 111. By the process 111, a scene in which the artificial voice is to be communicated is detected. The scene in which the artificial voice is to be communicated is, for example, a scene in which the autonomous driving of the vehicle 1 is started. In this case, the processor 11 determines the timing at which the autonomous driving is started based on information received from an autonomous driving apparatus 200, which performs autonomous driving of the vehicle 1. Then, when it is determined that it is the timing at which the autonomous driving is started, the processor 11 detects a scene in which the artificial voice is communicated.

The processor 11 may detect a scene in which the artificial voice is communicated based on information received from a device other than the autonomous driving apparatus 200, for example, the recognition sensor 22. For example, the processor 11 calculates a distance between the vehicle 1 and a preceding vehicle based on information obtained by the recognition sensor 22 recognizing the preceding vehicle. Then, when the distance between the vehicle 1 and the preceding vehicle has become smaller than a predetermined distance, the processor 11 detects the scene as a scene in which the artificial voice is communicated.

Alternatively, the processor 11 may detect a scene in which the artificial voice is communicated, based on the map information stored in the storage device 12 and position information detected by the position sensor 23. For example, the processor 11 acquires a current position of the vehicle 1 from the position sensor 23. Further, the processor 11 acquires a destination of the vehicle 1 registered in the map information. Then, when it is determined that the vehicle 1 comes near the destination based on these pieces of information, the processor detects a scene in which the artificial voice is to be communicated. Similarly, as another example, when the vehicle 1 comes near an intersection or a sharp curve, the processor 11 may detect a scene in which the artificial voice is to be communicated base on the map information and the position information of the vehicle 1.

The processor 11 may execute the process 111 by using the machine learning model. In other words, a scene in which the artificial voice is communicated may be detected by the machine learning model.

Next, the processor 11 executes the process 112. The content of the message conveyed by the artificial voice is determined in the process 112. The content of the artificial voice is determined according to the scene detected by the process 111. The contents of the artificial voice corresponding to the respective scenes are, for example, stored in advance in the storage device 12. Alternatively, the processor 11 may execute the process 112 by using the machine learning model. In other words, the content of the message conveyed by the artificial voice may be determined by the machine learning model.

The processor 11 executes the process 113 and the process 114 in parallel with the process 111 and the process 112. A parameter related to the motion of the vehicle 1 is acquired as the first parameter by the process 113. Examples of the parameters related to the motion of the vehicle 1 include the speed, the acceleration, the steering angle, the yaw rate, the roll angular speed, the pitch angular speed, and the yaw angular speed of the vehicle 1. The processor 11 can acquire these parameters from the vehicle state sensor 21.

Next, the processor 11 executes the process 114. The second parameter is determined by the process 114. The second parameter is a parameter related to the property of the artificial voice generated by the voice communication system 100. Examples of the second parameter include parameters representing volume (in other word, loudness, sound pressure, or amplitude), pitch (in other word, a frequency), and sound quality (in other word, a waveform) of the artificial voice. The second parameter is determined so as to be linked to the first parameter acquired by the process 113.

Examples of a combination of the first parameter and the second parameter are shown in a table of FIG. 4. The processor 11, for example, links the acceleration of the vehicle 1 to the pitch of the artificial voice and determines the pitch of the artificial voice so as to become higher as the acceleration of the vehicle 1 becomes larger. Alternatively, for example, the processor 11 links the speed of the vehicle 1 to the volume of the artificial voice and determines the volume of the artificial voice so as to become larger as the speed of the vehicle 1 becomes higher. Alternatively, for example, the processor links the yaw rate of the vehicle 1 to the sound quality of the artificial voice and determines the sound quality of the artificial voice so as to change in accordance with an increase or a decrease of the yaw rate of the vehicle 1.

The combinations shown in the table of FIG. 4 are merely examples, and arbitrary parameters can be selected and combined as the first parameter and the second parameter. In addition, the parameters to be linked need not to be a combination of one first parameter and one second parameter, and a plurality of second parameters may be linked to one first parameter. For example, both the pitch and the volume of the artificial voice may be changed so as to be linked to the acceleration of the vehicle 1.

The combination of the first parameter and the second parameter and the correspondence representing how to link both parameters are stored in advance in the storage device 12, for example. Alternatively, the processor 11 may execute the process 114 by using the machine learning model. In other words, the second parameter may be determined by the machine learning model so as to be linked to the first parameter.

FIG. 3 is referred to again. After the execution of the process 112 and the process 114, the processor 11 executes the process 115. By the process 115, the artificial voice is generated based on the content determined by the process 112 and the parameters determined by the process 114. In the process 115, the processor 11 generates the artificial voice similar to the human voice using the machine learning model. A method of synthesizing the artificial voice reading predetermined words by using a machine learning model is known, and thus description thereof is omitted. The generated artificial voice data is sent to the speaker 30, and the artificial voice is output from the speaker 30.

The voice communication system 100 communicates the voice by the above processing. As described in the above processing, according to the voice communication system 100 of the present embodiment, the second parameter related to the property of the artificial voice is changed so as to be linked to the first parameter related to the motion of the vehicle 1 when the voice is communicated. This makes it easy for the user to recognize that the voice communicated by the voice communication system 100 is the artificial voice. That is, when a change in the property of the voice occurs, which does not occur in the actual human voice, it is possible to make it easy for the user to notice that the voice emitted by the voice communication system 100 is the artificial voice and prevent the user from erroneously recognizing that the voice is emitted by a human.

Further, according to the voice communication system 100 of the present embodiment, not only the second parameter is merely changed, but also the second parameter is changed so as to be linked to the first parameter. This makes it easier for the user to recognize the voice communicated by the voice communication system 100 as the artificial voice.

The user riding on the vehicle 1 can physically feel the motion of the vehicle 1, which is used for determining the first parameter. Therefore, the user can easily notice that the change in the second parameter is linked to the first parameter. In addition, the change in the property of the voice linked to the parameter related to the behavior of the vehicle 1 cannot normally occur in the human voice. Therefore, it is possible to make it easier for the user to recognize that the change in the second parameter does not accidentally occur but is made by the voice communication system 100.

As one of methods for making it easy to discriminate between the artificial voice generated by the system and the actual human voice, it is considered to change the artificial voice into a mechanical voice to estrange it from the human voice. However, for the user, who receives the voice, it is likely that voice similar to the human voice sounds more comfortable than the mechanical voice. According to the voice communication system 100 of the present embodiment, since it is possible to improve ease of distinguishing the artificial voice while keeping the artificial voice close to the human voice, it is possible to increase the user's satisfaction while ensuring the transparency of the system.

3. Modification

3-1. First Modification (Modification Related to First Parameter)

Figure 5:
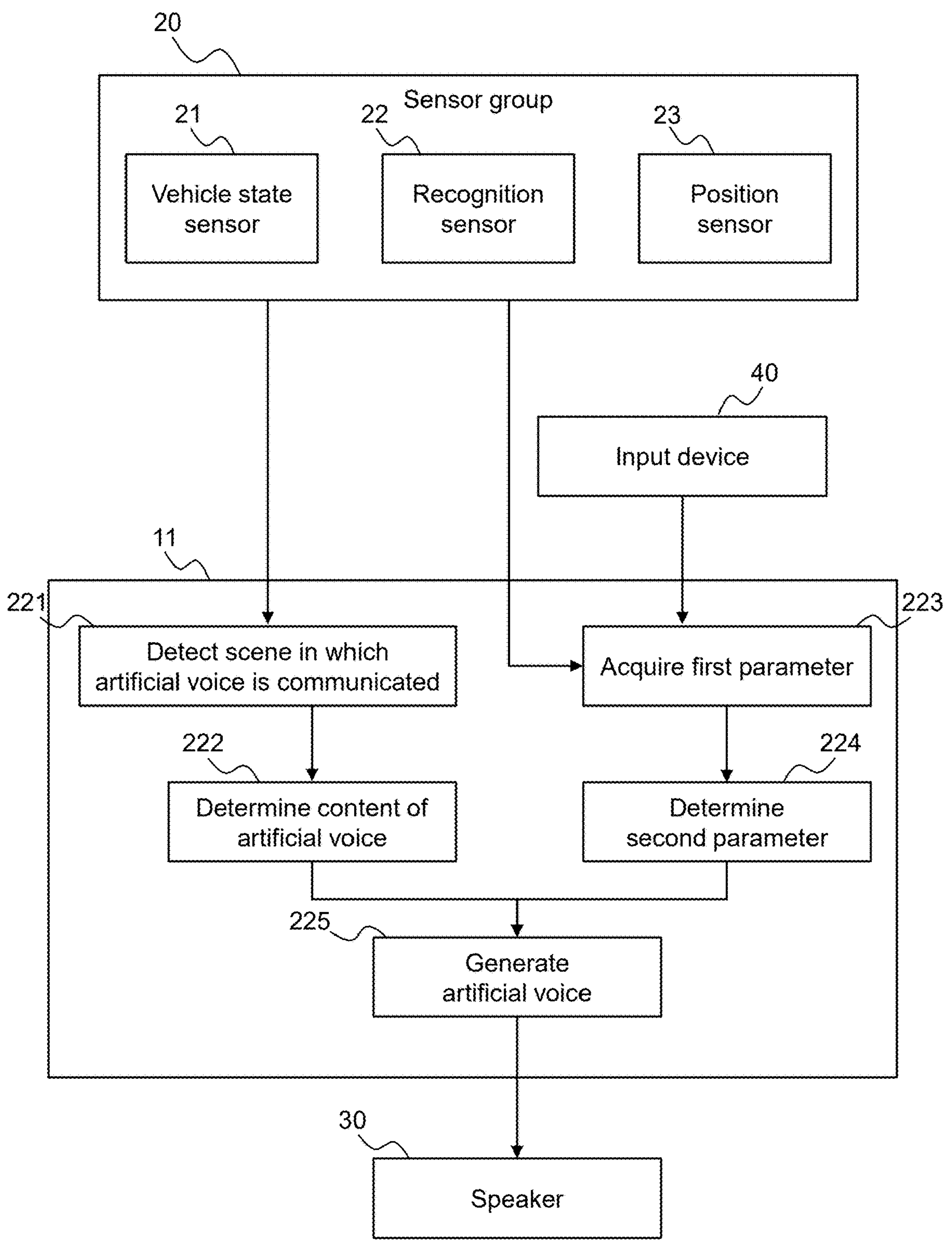
FIG. 5 is a block diagram showing another example of processing by the voice communication system.

As the first parameter, a parameter other than the parameter related to the motion of the vehicle 1 may be used. For example, a parameter related to an operation amount input by the driver of the vehicle 1 may be set as the first parameter. FIG. 5 is a block diagram showing an example of processing by the voice communication program in a case where the parameter related to the operation amount by the driver of the vehicle 1 is used as the first parameter. In this case, the computer 10 is connected to an input device 40 in addition to the sensor group 20 and the speaker 30 via the in-vehicle network. The input device 40 is a device to which the driver of the vehicle 1 inputs the operation amount. Examples of the operation amount input by the driver include an accelerator operation amount, a brake operation amount, and a steering operation amount. Examples of the input device 40 include an accelerator pedal, a brake pedal, and a steering wheel.

Processes 221 and 222 are similar to the processes 111 and 112 of FIG. 3. In addition, it is also similar to the processing in FIG. 3 that a process 223 and the process 224 are executed in parallel with the processing 221 and the process 222 and that the first parameter is acquired by the process 224. However, the first parameter acquired by the process 223 is a parameter related to the operation amount by the driver of the vehicle 1. The processor 11 acquires the operation amount by the driver from the input device 40 and sets the operation amount as the first parameter or calculates the first parameter based on the acquired operation amount.

The first parameter may be a parameter representing the operation amount itself input by the driver. For example, a parameter representing the accelerator operation amount input to the input device 40 by the driver may be set as the first parameter.

Alternatively, a difference between an ideal operation amount and the operation amount actually input by the driver may be used as the first parameter. The processor 11 can calculate an ideal operation amount based on the information acquired from the sensor group 20. For example, the operation amount for keeping the constant speed of the vehicle 1 may be set as the ideal operation amount. In this case, the processor 11 can calculate the ideal operation amount based on the acceleration of the vehicle 1 acquired from the vehicle state sensor 21. Alternatively, for example, the operation amount for keeping a constant distance from the preceding vehicle may be set as the ideal operation amount. The processor 11 may calculate the distance between the vehicle 1 and the preceding vehicle from the information obtained by the recognition sensor 22 recognizing the preceding vehicle. Then, the processor 11 may set the accelerator operation amount for keeping the constant distance from the preceding vehicle as the ideal operation amount. Alternatively, the processor 11 may set the operation amount calculated in consideration of a change in a gradient. In this case, the processor 11 may calculate the ideal operation amount such that the accelerator operation amount becomes larger when the vehicle 1 travels in a road having an upward gradient and the brake operation amount becomes larger when the vehicle 1 travels in a road having a downward gradient, based on the inclination angle of the vehicle 1 acquired from the vehicle state sensor 21.

That the parameter related to the operation amount by the driver is set as the first parameter means that a parameter related to the operation input by the driver himself/herself, who is the user of the vehicle 1, is set as the first parameter. In other words, the first parameter is made a parameter related to an amount that the driver can grasp by himself/herself. Therefore, the driver can more easily notice that the second parameter related to the artificial voice is changed so as to be linked to the first parameter. In this way, it is possible to make it easier for the user to recognize that the voice communicated by the voice communication system 100 is the artificial voice using the machine learning model, and it is possible to increase the transparency of the system.

Further, when the difference between the ideal operation amount and the operation amount actually input by the driver is used as the first parameter, the following effects are also expected. Here, as an example of a specific scene, a scene is considered in which the voice communication system 100 communicates the artificial voice for attracting attention respond to the accelerator operation amount by the driver becoming small or large. For example, when the vehicle 1 approaches an upward slope, the accelerator operation amount may become insufficient while the driver does not notice the situation, and the vehicle 1 may decelerate. In such a situation, it is assumed that the voice communication system 100 communicates the artificial voice to attract an attention and urge the driver to increase the accelerator operation amount.

Here, it is assumed that the first parameter is the difference between the ideal accelerator operation amount and the accelerator operation amount actually input, and the second parameter is the pitch of the artificial voice. In this case, the pitch of the artificial voice changes in accordance with the difference between the ideal accelerator operation amount and the accelerator operation amount by the driver. The voice communication system 100 can communicates not only the fact that the accelerator operation amount is insufficient by the content conveyed by the artificial voice but also how much the accelerator operation amount the driver should input by the change in the pitch of the artificial voice. That is, the driver can intuitively grasp how much the operation amount is insufficient.

As still another example of the first parameter, a distance between the vehicle 1 and a target present in front of the vehicle 1 may be used. Examples of the target present in front of the vehicle 1 include the preceding vehicle.

However, it is desirable that the first parameter is a parameter which the user can physically feel. This is because, by setting the first parameter to be a parameter in which the user can easily feel a change, the user can easily notice that the first parameter and the second parameter are linked, and it is more effective in preventing the user from erroneously recognizing the artificial voice as the human voice. Therefore, it is optimal that the parameter related to the motion of the vehicle 1 or the operation amount by the driver of the vehicle 1 is set as the first parameter.

3-2. Second Modification (Modification Related to Second Parameter)

As the second parameter, a parameter other than the parameter related to the property of the artificial voice may be used. For example, a speaking speed of the artificial voice may be used as the second parameter. In this case, for example, it is assumed that the speed of the vehicle 1 is set as the first parameter and the first parameter and the second parameter are linked such that the speaking speed increases as the vehicle speed becomes higher.

Alternatively, when the speaker 30 includes a plurality of speakers, the second parameter may be a parameter representing the position of the speaker which replays the artificial voice. For example, a case where a plurality of speakers 30 are installed on the left side, right side, and center of the inside of the vehicle as shown in FIG. 2 is assumed. It is also assumed that the first parameter is set to be the steering angle of the vehicle 1, and the second parameter is set to be the position of the speaker which replays the artificial voice. In this case, the steering angle and the position of the speaker may be linked such that the sound source moves toward the left side or right side as the steering angle turns to the left or right. Concretely, it is assumed that the artificial voice is emitted from the right speaker 30*a* when the steering angle turns to the right, from the left speaker 30*c* when the steering angle turns to the left, and from the center speaker 30*b* when the steering angle is close to 0. This makes it easier for the user to recognize the change in the second parameter that is linked to the first parameter, and it is possible to improve the ease of distinguishing that the voice communicated from the voice communication system 100 is the artificial voice.

3-3. Third Modifications (Voice Communication as Conversation)

In the above embodiment, the artificial voice communicated to the user by the voice communication system 100 is unilaterally conveyed for the purpose of notifying information or the like. However, the voice communication system 100 may communicate the artificial voice for the purpose of conversation with the user.

Figure 6:
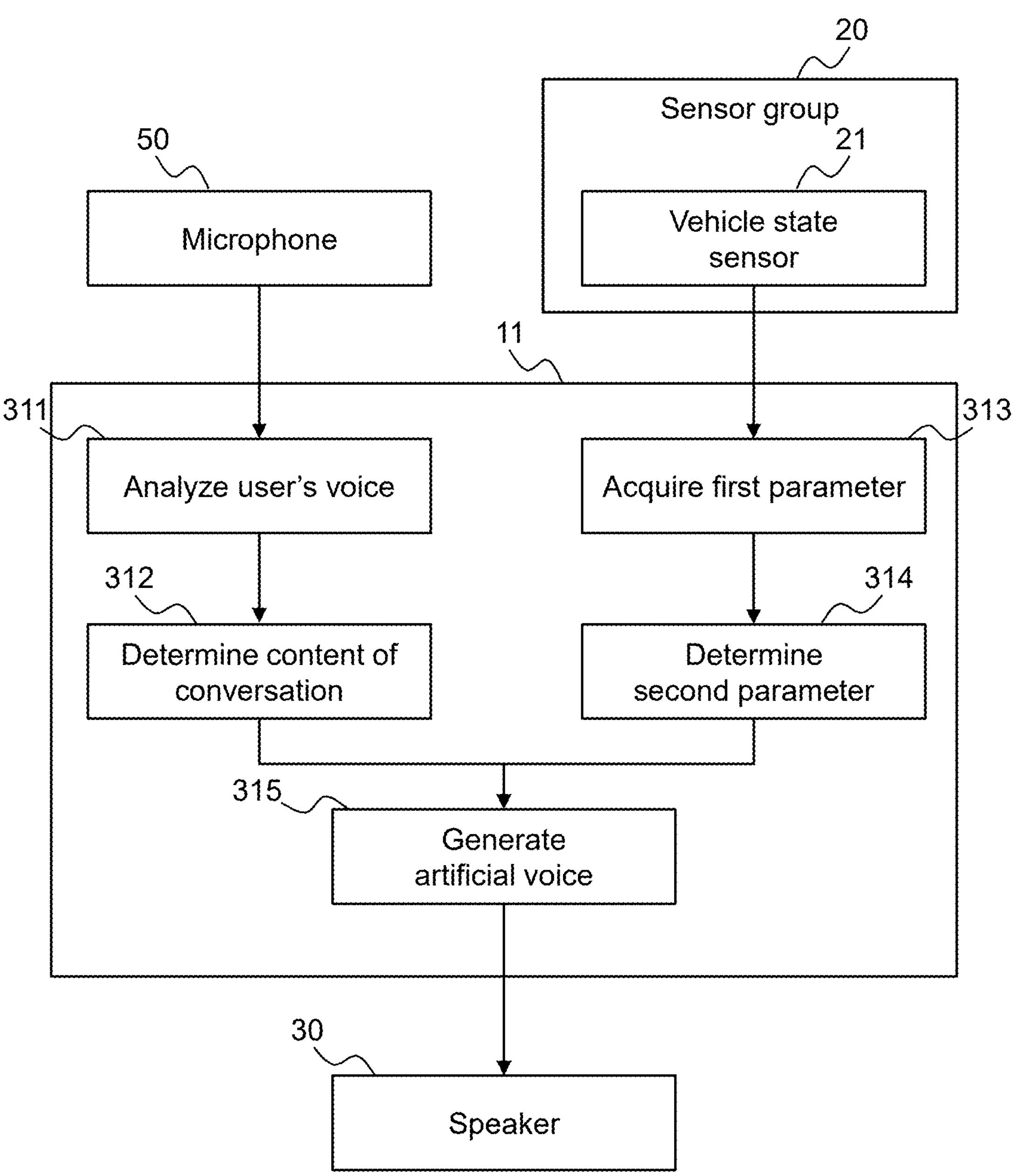
FIG. 6 is a block diagram showing still another example of processing by the voice communication system.

FIG. 6 shows an example of processing executed by the voice communication program when the voice is communicated for the purpose of conversation with the user. In this modification, the voice communication system 100 includes a microphone 50 for collecting voice uttered by the user. When the processor 11 executes a process 311, the microphone 50 collects the user's voice and the collected voice is analyzed. The processor 11 may perform the voice analysis by using the machine learning model.

Next, the processor 11 executes a process 312. In the process 312, the content of the conversation for responding to the user's voice analyzed by the process 311 is determined by the machine learning model.

Processes 313, 314, and 315 are similar to the processes 113, 114, and 115 of FIG. 3. By the process 315, the artificial voice is generated based on the content of the conversation determined by the process 312 and the generated voice is communicated to the user through the speaker 30.

When the artificial voice is intended for conversation, the voice communication system 100 is likely to continuously communicate the voice for a certain period of time. Therefore, it is possible to make it easy for the user to notice the change in the second parameter of the artificial voice, and the ease of distinguishing that the voice communicated from the voice communication system 100 is the artificial voice can be increased.

3-4. Fourth Modification (Voice Communication System as Autonomous Driving System)

The voice communication system 100 may be a part of an autonomous driving system of the vehicle 1. In this case, the autonomous driving apparatus 200 of the vehicle 1 is configured by a part or all of the processor 11 and the storage device 12. The autonomous driving apparatus 200 may be an apparatus which performs autonomous driving of the vehicle 1 using the machine learning model.

3-5. Fifth Modification (Upper and Lower Limits of Second Parameter)

The second parameter may have an upper limit and a lower limit. By providing the upper limit and the lower limit, even when the first parameter changes greatly, it is possible to prevent the second parameter from changing too much. In particular, in a case where the second parameter is the volume or the pitch of the artificial voice, it is effective to provide the upper limit and the lower limit. That is, in a case where the second parameter is the volume of the artificial voice, by providing the upper limit and the lower limit to the second parameter, it is possible to prevent the volume of the artificial voice from becoming excessively large or excessively small linked to the first parameter and thus prevent the voice from becoming difficult to hear for the user. Similarly, in a case where the second parameter is the pitch of the artificial voice, it is possible to prevent the pitch from becoming excessively high or excessively low and thus prevent the artificial voice from becoming difficult to hear for the user.

The upper limit and the lower limit of the second parameter are set in consideration of the ease of hearing for the user and the like and are stored in the storage device 12 in advance. In this modification, when the second parameter exceeds the upper limit or falls below the lower limit, the second parameter stops changing even if the first parameter changes more. However, in this case, the property of the artificial voice already changes to a level unnatural as the human voice, and thus it is considered that the user is unlikely to erroneously recognize the voice by the voice communication system 100 as the human voice.

4. Example of Application

4-1. First Example

Finally, a concrete example of a scene to which the voice communication system 100 according to the present embodiment is applied is described. In the first example, a scene in which the vehicle 1 travels in a road inclined in a lateral direction is considered. It is assumed that the first parameter is a roll angle of the vehicle 1 and the second parameter is the sound quality of the artificial voice. When there is a possibility that the vehicle 1 rolls over due to an increase in the roll angle caused by an excessively high speed of the vehicle 1, it is assumed that the voice communication system 100 communicates voice to the driver for attracting attention. At this time, the driver can easily recognize that the voice transmitted from the voice communication system 100 is the artificial voice because of the change in the sound quality of the artificial voice linked to the roll angle of the vehicle 1. At the same time, by the sound quality of the artificial voice changed so as to be linked to the roll angle of the vehicle 1, the driver can feel the magnitude of the roll angle also from the change in the sound quality, and then, the driver can easily recognize how much the operation amount is necessary to restore the vehicle 1 to correct posture.

4-2. Second Example

As the second example, a case is considered in which the vehicle 1 is a vehicle towing a trailer, and the recognition sensor 22 includes the back camera, which captures the backward image from the vehicle 1. In this case, the first parameter may be a parameter related to a swing of the trailer towed by the vehicle 1 and the second parameter may be the volume of the artificial voice. As the parameter related to the swing of the trailer, for example, a speed, magnitude, a cycle, or the like of the swing is set as the first parameter. The processor 11 can acquire such parameter related to the swing of the trailer by image analysis of the image captured by the back camera.

It is assumed that if the trailer towed by the vehicle 1 starts swinging to the left and right, the voice communication system 100 communicates the artificial voice to the user to inform the user that the trailer is swinging. At this time, for example, the volume of the artificial voice is linked to the magnitude of the swing such that the volume of the artificial voice increases as the swing of the trailer increases. By the second parameter changed so as to be linked to the first parameter, it can make it easy for the user to distinguish that the voice communicated from the voice communication system 100 is the artificial voice. At the same time, the user can easily recognize the magnitude of the swing by the volume of the artificial voice. That is, since the volume of the artificial voice increases as the swing increases and the importance of a countermeasure increases, the user can easily understand the importance of the situation notified by the artificial voice.

What is claimed is:

1. A voice communication system comprising processing circuitry configured to:

generate an artificial voice similar to a human voice by a machine learning model;

communicate the artificial voice to a user of a vehicle;

acquire a first parameter related to at least one of a motion of the vehicle and an operation amount input by a driver of the vehicle; and change a second parameter related to a property of the artificial voice so as to be linked to the first parameter.

2. The voice communication system according to claim 1, wherein the first parameter is one of a speed, acceleration, and a steering angle of the vehicle.

3. The voice communication system according to claim 1, wherein the second parameter includes at least one of volume, pitch, and sound quality of the artificial voice.

4. The voice communication system according to claim 3, wherein the first parameter is acceleration of the vehicle, the second parameter includes the pitch of the artificial voice, and the machine learning model makes the pitch of the artificial voice higher as the acceleration increases.

5. The voice communication system according to claim 3, wherein the second parameter has an upper limit and a lower limit.

6. The voice communication system according to claim 1, wherein the first parameter is a difference between an ideal operation amount and an operation amount actually input by the driver.

7. A voice communication method, comprising:

generating an artificial voice similar to a human voice by a machine learning model;

communicating the artificial voice to a user of a vehicle; and acquiring a first parameter related to at least one of a motion of the vehicle and an operation amount input by a driver of the vehicle; and changing a second parameter related to a property of the artificial voice so as to be linked to the first parameter.

8. The voice communication method according to claim 7, wherein the first parameter is one of a speed, acceleration, and a steering angle of the vehicle.

9. The voice communication method according to claim 7, wherein the second parameter includes at least one of volume, pitch, and sound quality of the artificial voice.

10. The voice communication method according to claim 9, wherein the first parameter is acceleration of the vehicle, the second parameter includes the pitch of the artificial voice, and the machine learning model makes the pitch of the artificial voice higher as the acceleration increases.

11. The voice communication method according to claim 9, wherein the second parameter has an upper limit and a lower limit.

12. The voice communication method according to claim 7, wherein the first parameter is a difference between an ideal operation amount and an operation amount actually input by the driver.

13. A non-transitory computer-readable storage medium storing a voice communication program comprising a plurality of executable instructions configured to cause a computer to execute:

generating an artificial voice similar to a human voice by a machine learning model;

communicating the artificial voice to a user of a vehicle; and acquiring a first parameter related to at least one of a motion of the vehicle and an operation amount input by a driver of the vehicle; and changing a second parameter related to a property of the artificial voice so as to be linked to the first parameter.

14. The non-transitory computer-readable storage medium according to claim 13, wherein the first parameter is one of a speed, acceleration, and a steering angle of the vehicle.

15. The non-transitory computer-readable storage medium according to claim 13, wherein the second parameter includes at least one of volume, pitch, and sound quality of the artificial voice.

16. The non-transitory computer-readable storage medium according to claim 15, wherein the first parameter is acceleration of the vehicle, the second parameter includes the pitch of the artificial voice, and the machine learning model makes the pitch of the artificial voice higher as the acceleration increases.

17. The non-transitory computer-readable storage medium according to claim 15, wherein the second parameter has an upper limit and a lower limit.

18. The non-transitory computer-readable storage medium according to claim 13, wherein the first parameter is a difference between an ideal operation amount and an operation amount actually input by the driver.

* * * * *